(12) United States Patent
Burger et al.

(10) Patent No.: US 6,376,942 B1
(45) Date of Patent: Apr. 23, 2002

(54) BATTERY-POWERED DRILL

(75) Inventors: Helmut Burger, Moorenweis; Josef Fünfer, Königsbrunn, both of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/524,471

(22) Filed: Mar. 13, 2000

(30) Foreign Application Priority Data

Mar. 15, 1999 (DE) .......................... 199 11 362

(51) Int. Cl.⁷ .............................. H02K 7/14; H01M 6/00
(52) U.S. Cl. .............................. 310/47; 310/50; 429/97; 429/123
(58) Field of Search .............................. 310/71, 47, 50; 429/96, 97, 100, 123; 320/2, 3, 106, 114

(56) References Cited

U.S. PATENT DOCUMENTS

| | | | |
|---|---|---|---|
| 3,999,110 A | * 12/1976 | Ramstrom et al. | 320/2 |
| 4,013,907 A | * 3/1977 | Mabuchi | 310/50 |
| 4,399,201 A | * 8/1983 | Nagahara | 429/48 |
| 4,751,452 A | * 6/1988 | Kilmer et al. | 320/2 |
| 5,578,391 A | 11/1996 | Meyers et al. | 429/97 |
| 5,796,188 A | * 8/1998 | Bays | 310/50 |
| 5,881,823 A | * 3/1999 | Kabatnik et al. | 173/217 |

FOREIGN PATENT DOCUMENTS

| | | |
|---|---|---|
| DE | 9521423 | 12/1996 |
| EP | 0374600 | 6/1990 |
| EP | 0726586 | 8/1996 |

OTHER PUBLICATIONS

Patent Abstract of Japan, No. 58.106758, 6/83.
European Search Report, Jun. 13, 2000.

* cited by examiner

*Primary Examiner*—Nestor Ramirez
*Assistant Examiner*—Dang Dinh Le
(74) *Attorney, Agent, or Firm*—Sidley Austin Brown & Wood, LLP

(57) ABSTRACT

A battery-powered drill including a housing (2) with a handle (3), an electrical drive motor (19) located in the housing (2) a battery unit (11) insertable into the housing (2) and fixedly securable therein for supplying electrical power to the electrical drive motor, a connection device for connecting the battery unit (11) with the electrical drive motor (19) and including a connector element (10) projecting from the battery unit (11) and a mating connector element (9) provided in the housing (2) and electrically connectable with the connector element (10) provided on the battery unit (11), and a press pin element for supporting the battery unit on the housing (2) and displaceable against a spring-biasing force upon the mounting of the battery unit (11) on the housing (2) for securing the battery unit (11) on the housing (2).

3 Claims, 2 Drawing Sheets

BATTERY-POWERED DRILL

BACKGROUND OF THE INVENTION

1. Field of the Invention

The present invention relates to a battery-powered drill including a housing, a handle connected with the housing, an electrical drive motor located in the housing, a battery unit insertable into the housing and fixedly securable therein for supplying electrical power to the electrical drive motor, a connection device for connecting the battery unit with the electrical drive motor and including a connector element projecting from the battery unit and a mating connector element provided in the housing and electrically connectable with the connector element provided on the battery unit upon mounting of the battery unit in the housing.

2. Description of the Prior Art

German Publication DE-195 21 423 discloses a battery-powered drill having an electrical drive motor to which the electrical power is supplied from a battery unit which is mounted on the drill housing. The battery unit is fixedly secured to the drill housing by a pin-shaped locking element which is arranged on the housing and is spring-biased into an opening formed in the battery unit. The pin-shaped locking element is pulled out of the opening in the battery unit with a coupler. The electrical connection between the drive motor and the battery unit is insured by a connector element which is provided on the battery unit and, upon mounting of the battery unit on the housing, is connected with a mating connector element provided on the housing.

To insure a reliable engagement of the locking element in the opening formed in the battery unit, the cross-section of the opening is made larger than the cross-section of the locking element. The clearance, which is formed between the locking element and the opening, leads to a relative displacement between the battery unit and the housing and, thus, between the cooperating connector elements when the drill is subjected to shocks. The relative movement between the connector elements may damage the contact elements of one or both connector elements which, in turn, may result in a faulty contact therebetween.

Accordingly, an object of the present invention is to provide a battery-powered drill that would insure a reliable, fixed mounting of the battery unit on the drill housing so that no relative movement between the connector elements of the battery unit and the housing takes place when the drill is subjected to shocks.

SUMMARY OF THE INVENTION

This and other objects of the present invention, which will become apparent hereinafter, are achieved, according to the present invention, by providing press pin means which supports the battery unit against the housing and which is displaceable against a spring-biasing force upon mounting the battery unit on the housing, securing fixedly the battery unit on the housing.

The spring for biasing the press pin means becomes preloaded upon the mounting of the battery unit on the housing, and applies to the housing, in the locking position of the battery unit on the housing in which the connector elements are connected with each other, a force acting in the direction opposite to the mounting direct of the battery unit. As a result of the application of the spring force to the housing, a locking element or member which is provided on the battery unit and projects into an opening formed in the housing, is pressed against an inner profile of the opening facing in the mounting direction. In this way, the clearance between the opening and the locking member is eliminated which prevents the relative movement between the two connector elements when the drill is subjected to shocks.

For manufacturing reasons, preferably, the press pin element is provided on the battery unit and is displaced against a biasing force in a direction opposite to the mounting direction. For receiving the press pin element and the biasing spring, bore(s) is (are) provided in the battery unit. The receiving bore is open in the mounting direction and is closed in the opposite direction.

In order to provide for mounting of the battery unit on the drill housing and insure that the battery unit remains in the mounting position, without the press pin element of the battery unit being pressed out of the receiving bore and, thus, without the interruption of the contact between the connector elements, advantageously, the press pin element cooperates with a mating surface provided in the housing and facing in the direction opposite the mounting direction.

For manufacturing reasons, advantageously, the mating surface provided in the housing is formed by a bolt connected with the housing and arranged coaxially with the press pin element. At that, the outer diameter of the bolt is smaller than the outer diameter of the press pin element. Due to its smaller diameter, the bolt can project into the bore, in which the press pin element is received, when the battery unit occupies its final position on the drill housing.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
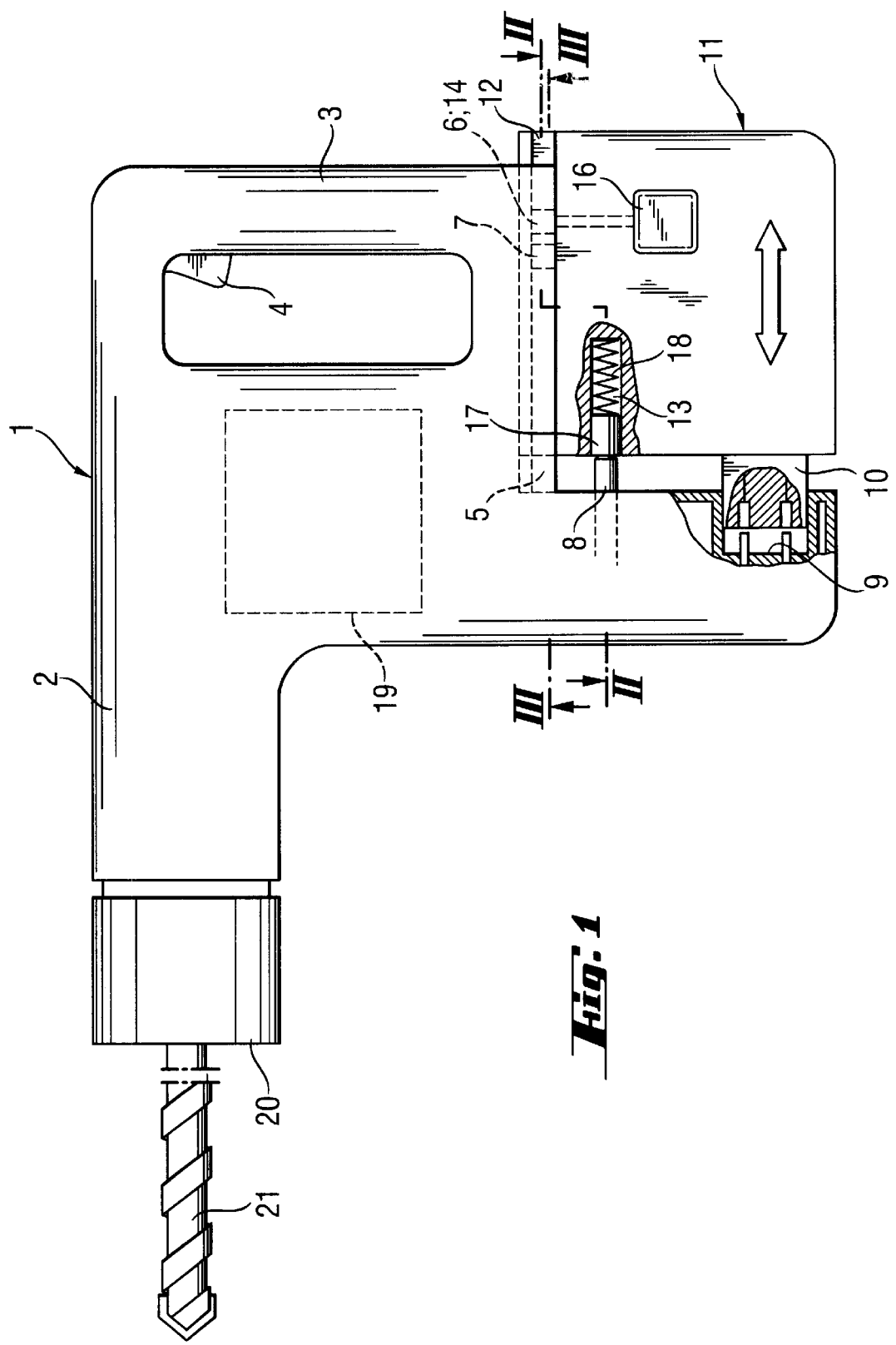
FIG. 1 a side, partially cross-sectional, simplified view of a battery-powered drill with an inserted battery unit according to the present invention.

A battery-powered drill according to the present invention, which is shown in FIG. 1, includes a housing 2 having a handle 3 on which a trigger 4 for a drive motor 19, which is located in the housing 2, is arranged. In the end region of the housing 2 of the drill 1 facing in a drilling direction, a chuck 20 for receiving a drilling tool 21 is arranged. The drive motor 19 is supplied with a drive energy from a battery unit 11 which is mounted on the housing 2.

For the mounting of the battery unit 1 1 on the housing 2, the housing 2 is provided with the two, spaced from each other and extending parallel to each other, guide strips 5 which cooperate with two, spaced from each other, guide grooves 12.

Figure 2:
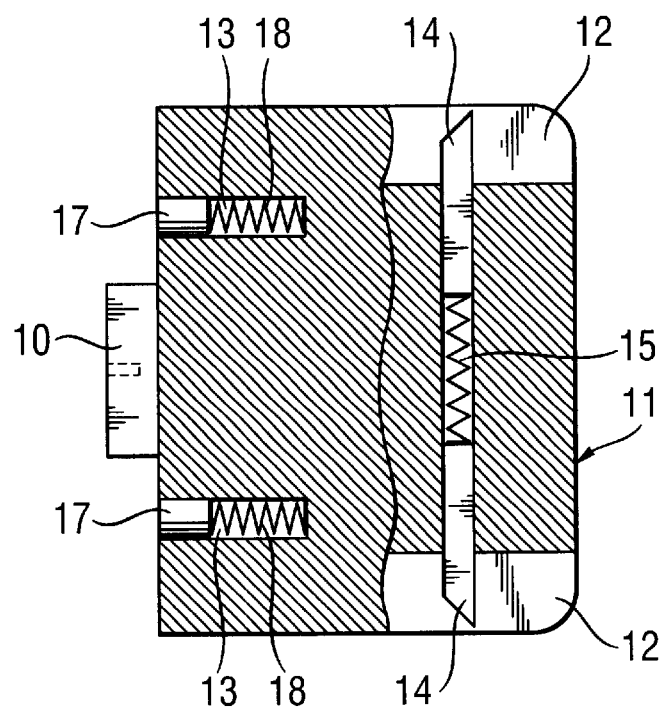
FIG. 2 a cross-sectional view along line II—II in FIG. 1 showing the battery unit.

As shown in FIG. 2, the battery unit 11 has, in the region of the guide grooves 12, two, arranged opposite each other, coaxial, pin-shaped, locking members 14 which are pressed into the open space of the grooves 12 by a spring 15 located between the two members 14. The two locking members 14 are connected with a mechanical device, not shown in detail, which can displace the two locking members 14 out of the open space of the guide grooves 12 into the interior of the battery unit 1 1. Two release buttons 16, which are provided on opposite sides of the battery unit 1 1, form part of the device for displacing the locking members 14 out of the open space of the guide grooves 12. The locking members 14 are displaced out of the open space of the guide grooves 12 upon pressing the release buttons 16.

Figure 3:
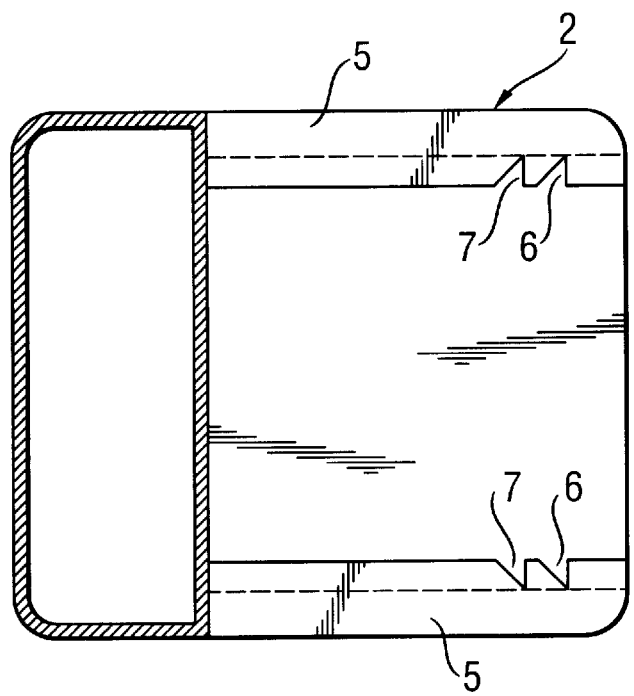
FIG. 3 a cross-sectional view along line III—III in FIG. 1 showing the battery unit and a portion of the drill housing with which the battery unit is connected.

As shown in FIG. 3, each of the guide strips 5, provided in the housing 2, has two notches 7, 6 one of which becomes engaged by the locking member 14 of the battery unit 1 1 upon the mounting of the battery unit 11 on the housing 2. The two, arranged one after another, notches 6, 7 provide for securing the battery unit 11 in two positions.

In the first position of the battery unit 11, the locking members 14 engage respective notches 6. In the first position of the battery unit 11, a connector element 10, which projects from the battery unit 11 is not electrically connected with a mating connector element 9 provided on the housing 2 and connected with the electrical drive motor 19, and the receiving opening of which is open in a direction opposite the mounting direction of the connector element 10 of the battery unit 11.

Upon further displacement of the battery unit 11, the battery unit 11 occupies its second position in which the locking members 14 engage the respective notches 7. In the second position of the battery unit 11 in the housing 2, the connector element 10 of the battery unit 11 becomes electrically connected with the mating connector element 10 in the housing 2. At least in the second position of the battery unit 11 in the housing 2, press pins 17, which are provided in the battery unit 11, abuts mating surfaces which are formed by free ends of bolts 8 provided in the housing 2 and arranged coaxially with the respective press pins 17. The outer diameter of the bolt 8 is smaller than the outer diameter of the press pin 17. The press pin 17 is located in a guide bore 13 provided in the battery unit 11. The press pin 17 cooperates with a spring 18 likewise located in the guide bore 13. The press pins 17 push, in the second position of the battery unit 11, the locking members 14 into the engagement with the second notches 7 in the guide strips 5. The press pins 17 prevent any clearance between the locking members 14 and the respective notches 7. Thereby, shocks, which can act on the drill 11 or are originated by the drill 1 itself, do not cause any relative movement between the battery unit 11 and the drill housing 2, i.e., between the connector elements 10 and 9.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claims is:

1. A battery-powered drill, comprising a housing (2); a handle (3) connected with the housing (2); an electrical drive motor (19) located in the housing (2); a battery unit (11) insertable into the housing (2) and fixedly securable therein for supplying electrical power to the electrical drive motor (19); connection means for connecting the battery unit (11) with the electrical drive motor (19) and including a connector element (10) projecting from the battery unit (11) and a mating connector element (9) provided in the housing (2) connected with the electrical drive motor (19) and electrically connectable with the connector element (10) provided on the battery unit (11) upon mounting of the battery unit (11) on the housing (2); and press pin means with which the battery unit 11 is supported on the housing and which are displaceable against a spring-biasing force upon the mounting of the battery unit (11) on the housing (2), wherein the press pin means is provided on the battery unit (11) and is displaceable in a direction opposite the mounting direction of the battery unit (11), and wherein the spring-biasing force is applied by spring means (18) located in the battery unit (11), wherein the battery-powered drill further comprises means connected with the housing (2), projecting into the battery unit (11) upon mounting of the battery unit (11) on the housing (2), and defining a mating surface cooperating with the press pin means (17), and wherein the means connected with the housing companies bolt means (8) connected with the housing (2) and arranged coaxially with the press pin means, a free end of the bolt means defining the mating surface, and the bolt means having an outer diameter smaller than an outer diameter of the press pin means (17).

2. A battery-powered drill, comprising a housing (2); a handle (3) connected with the housing (2); an electrical drive motor (19) located in the housing (2); a battery unit (11) insertable into the housing (2) and fixedly securable therein for supplying electrical power to the electrical drive motor (19); connection means for connecting the battery unit (11) with the electrical drive motor (19) and including a connector element (10) projecting from the battery unit (11) and a mating connector element (9) provided in the housing (2) connected with the electrical drive motor (19) and electrically connectable with the connector element (10) provided on the battery unit (11) upon mounting of the battery unit (11) on the housing (2); means (14, 15) for retaining the battery unit (11) on the housing (2); and press pin means (17) displaceable against a spring-biasing force upon the mounting of the battery unit (11) on the housing (2) for preventing relative movement between the connector elements (9, 10) during operation of the drill.

3. A battery-powered drill according to claim 2, wherein the press pin means is provided on the battery unit (11) and is displaceable in a direction opposite the mounting direction of the battery unit (11), and wherein the spring-biasing force is applied by spring means (18) located in the battery unit (11).

* * * * *